US006662758B1

(12) United States Patent
Shin

(10) Patent No.: US 6,662,758 B1
(45) Date of Patent: Dec. 16, 2003

(54) CONDENSING GAS BOILER FOR RECOLLECTING CONDENSED LATENT HEAT USING UPTREND COMBUSTION

(75) Inventor: Youn Cheol Shin, Incheon (KR)

(73) Assignee: Kyungdong Boiler Co, Ltd. (KR)

( * ) Notice: Subject to any disclaimer, the term of this patent is extended or adjusted under 35 U.S.C. 154(b) by 0 days.

(21) Appl. No.: 10/385,090

(22) Filed: Mar. 10, 2003

(51) Int. Cl.$^7$ .................................................. F22B 5/02
(52) U.S. Cl. ...................................... 122/18.1; 122/7 R
(58) Field of Search ........................... 122/7 R, 2, 1 A, 122/20 B, 18.1; 110/234, 254

(56) References Cited

U.S. PATENT DOCUMENTS

| | | | | |
|---|---|---|---|---|
| 4,403,571 A | * | 9/1983 | Kochey, Jr. ................ | 122/1 A |
| 5,293,842 A | * | 3/1994 | Loesel ........................ | 122/7 R |
| 5,369,950 A | * | 12/1994 | Bruckner et al. ......... | 60/39.182 |
| 6,415,744 B1 | * | 7/2002 | Choi .......................... | 122/18.1 |
| 2003/0131804 A1 | * | 7/2003 | Iwama et al. .............. | 122/18.1 |

* cited by examiner

*Primary Examiner*—Jiping Lu
(74) *Attorney, Agent, or Firm*—Devine, Millimet & Branch; Paul Remus; Kevin Carroll

(57) ABSTRACT

A condensing gas boiler, which recollects condensed latent heat by uptrend combustion, is provided. Latent heat exchangers are disposed in the same area as that of a combustion chamber, and perpendicular with the combustion chamber. An exhaust gas guiding member is installed so that the exhaust gas is collected into a place in the rear portion of a latent heat portion to then pass through the latent heat exchangers. The latent heat exchangers are installed slantly in such a manner that re-absorption of the condensed latent heat can be done in the latent heat exchangers under the optimal condition. Thus, the condensing gas boiler, which recollects condensed latent heat by uptrend combustion, can realize a product of a high efficiency, lightness and compactness.

11 Claims, 4 Drawing Sheets

PRIOR ART

PRIOR ART

CONDENSING GAS BOILER FOR RECOLLECTING CONDENSED LATENT HEAT USING UPTREND COMBUSTION

BACKGROUND OF THE INVENTION

1. Field of the Invention

The present invention relates to a condensing gas boiler for recollecting condensed latent heat by uptrend combustion, and more particularly, to a condensing gas boiler for recollecting condensed latent heat by uptrend combustion, which realizes a product of a high efficiency, lightness and compactness, in which latent heat exchangers are disposed in the same area as that of a combustion chamber, and perpendicular with the combustion chamber, an exhaust gas guiding member is installed so that the exhaust gas is collected into a place in the rear portion of a latent heat portion to then pass through the latent heat exchangers, and the latent heat exchangers are installed slantly in such a manner that re-absorption of the condensed latent heat can be done in the latent heat exchangers under the optimal condition.

2. Description of the Related Art

In general, a gas boiler uses gas as a fuel, and heats water by using combustion heat generated when the gas is burnt, and circulates the circulation water into heating tubes installed indoors by means of a circulation pump for compulsively circulating the heated circulation water in order to make rooms warm. In addition, the heated circulation water is supplied to a bathroom and kitchen as warm or hot water.

A condensing gas boiler among the gas boilers is a boiler having a maximized thermal efficiency, which uses combustion heat and directly heats circulation water, and re-absorbs condensed latent heat in vapor or steam included in exhaust gas.

FIG. 1 is a configurational diagram schematically showing a conventional downtrend combustion type condensing boiler, and FIG. 2 is a configurational diagram schematically showing a conventional uptrend combustion type condensing boiler.

First, as shown in FIG. 1, a conventional downtrend type condensing gas boiler includes a burner 13 which is supplied with a predetermined amount of air and gas by an air blower fan 12. Accordingly, flames 14 are generated in the burner 13. The heat of the flames 14 is transferred to heat exchangers 15 to undergo heat exchanging. As a result, low-temperature water, which flows in the inner tube, is changed into high-temperature water.

Also, the heat exchangers 15 which are not directly exposed to the heat, contact the high-temperature exhaust gas, to perform heat exchanging. The condensed water generated by heat emission of the exhaust gas is discharged outside via a water exit tube 16. The exhaust gas whose temperature is lowered below a dew point through heat exchanging is discharged via an exhaust gas exit duct 17.

However, the downtrend type condensing gas boiler occupies an internal volume excessively by the exhaust gas exit duct 17, which makes it difficult to design a light and compact product. Also, since a load of the exhaust gas is excessive, that of the air blower fan 12 becomes larger.

As shown in FIG. 2, a conventional uptrend type condensing gas boiler includes a burner 13 which is supplied with a predetermined amount of air and gas by an air blower fan 12. Accordingly, flames 14 are generated in the burner 13. The heat of the flames 14 is transferred to main heat exchangers 22 to make low-temperature circulation water which flows through inner tubes in the main heat exchangers 22 changed into high-temperature water.

Also, the exhaust gas contacts auxiliary heat exchangers 23 installed on a flowing path of the exhaust gas exit duct 17 to undergo heat exchanging. Accordingly, the circulation water flowing in the auxiliary heat exchanger 23 is heated primarily.

The uptrend type condensing gas boiler forms a dead zone which is a zone where heat is emitted from the exhaust gas without any special purpose, between the main heat exchangers 22 and the auxiliary heat exchangers 23. As a result, a thermal efficiency is lowered.

Also, since a flowing path of the exhaust gas exit duct 17 is laterally disposed as a structure of taking a roundabout way of the combustion chamber, an exhaust gas exit resistance becomes larger. Also, a spatial restriction becomes severe due to an exhaust gas exit path in a limited space.

SUMMARY OF THE INVENTION

To solve the above problems, it is an object of the present invention to provide a condensing gas boiler for recollecting condensed latent heat by uptrend combustion, which realizes a product of a high efficiency, lightness and compactness, in which latent heat exchangers are disposed in the same area as that of a combustion chamber, and perpendicular with the combustion chamber, an exhaust gas guiding member is installed so that the exhaust gas is collected into a place in the rear portion of a latent heat portion to then pass through the latent heat exchangers, and the latent heat exchangers are installed slantly in such a manner that re-absorption of the condensed latent heat can be done in the latent heat exchangers under the optimal condition.

To accomplish the above object of the present invention, there is provided an uptrend combustion type condensing gas boiler for recollecting condensed latent heat, having a burner installed in the lower portion of a combustion chamber, for supplying heat; a present heat portion provided with present heat exchangers absorbing heat generated from the burner; and a latent heat portion provided with latent heat exchangers for absorbing heat of exhaust gas having passed through the present heat portion, the uptrend combustion type condensing gas boiler comprising: the latent heat portion integrally deposited on the upper portion of the present heat portion which is integrally formed with the combustion chamber, perpendicular with the present heat portion; an exhaust gas guiding member which is installed so that the exhaust gas is collected into a place in the rear portion of the latent heat portion to then flow into the front portion of the latent heat portion; the latent heat exchangers provided along the path where the exhaust gas flows from the rear portion to the front portion; and an exhaust gas exit formed in the upper end of the latent heat portion, for discharging the exhaust gas outside.

Here, the exhaust gas guiding member comprises: a lower guiding plate for collecting the exhaust gas flowing in from the combustion chamber into a place of the rear portion of the latent heat portion; and an upper guiding plate for making the exhaust gas collected in the place of the rear portion of the latent heat portion flow to the front portion so as to be discharged upwards via the exhaust gas exit.

Also, the latent heat exchangers installed between the upper guiding plate and the lower guiding plate are formed of a double or multiple structures, and installed slantly in order to maximize a heat transfer area.

Also, a condensed water exit for discharging the condensed water via a condensed water discharging tube is formed in the lower guiding plate.

BRIEF DESCRIPTION OF THE DRAWINGS

The above object and other advantages of the present invention will become more apparent by describing the preferred embodiment thereof in more detail with reference to the accompanying drawings in which.

DETAILED DESCRIPTION OF THE INVENTION

A preferred embodiment of the present invention will be described with reference to the accompanying drawings.

Here, the present embodiment does not limit a technical scope of the present invention, but presented as an example. The like or same elements as those of the conventional art are assigned with the like or same reference designations, of which detailed description thereof will be omitted.

Figure 1:
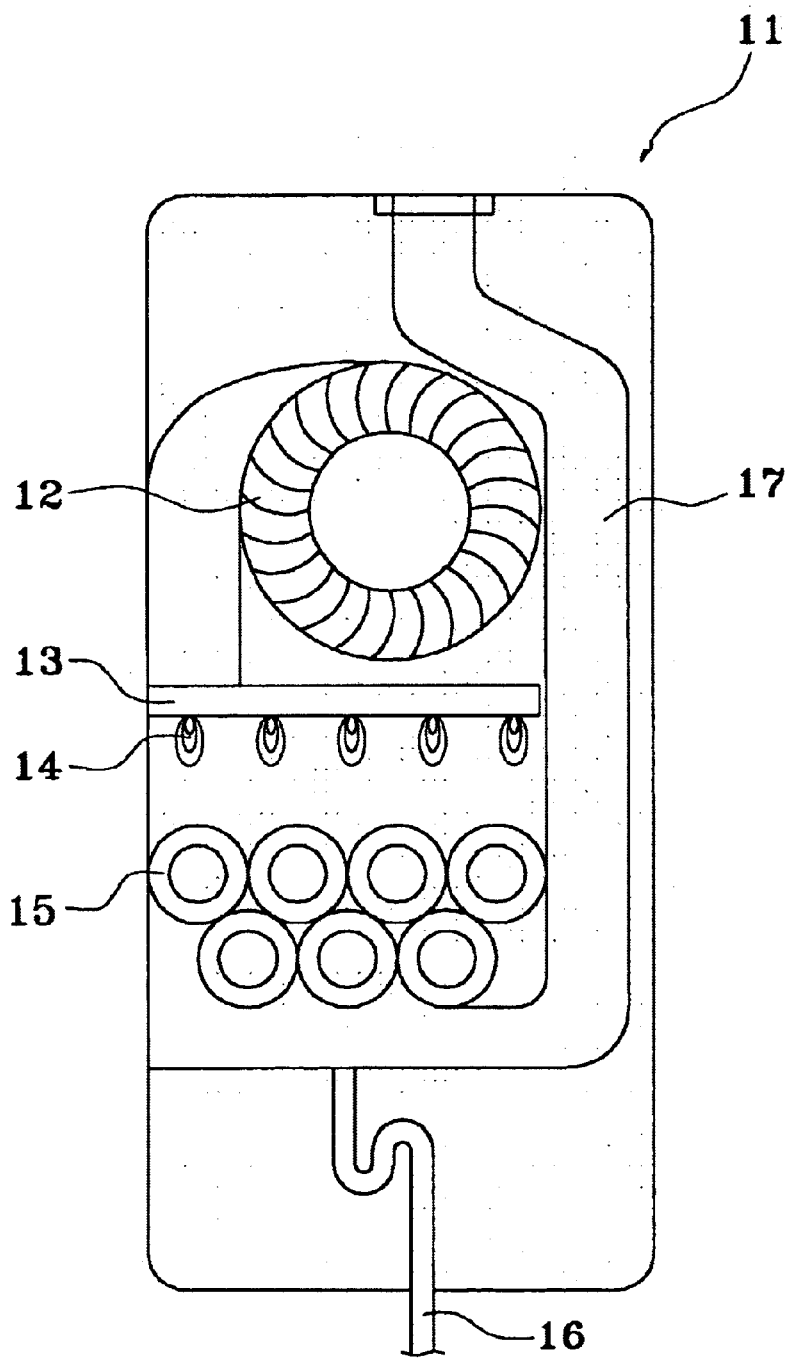
FIG. 1 is a configurational diagram schematically showing a conventional downtrend combustion type condensing boiler.
Figure 2:
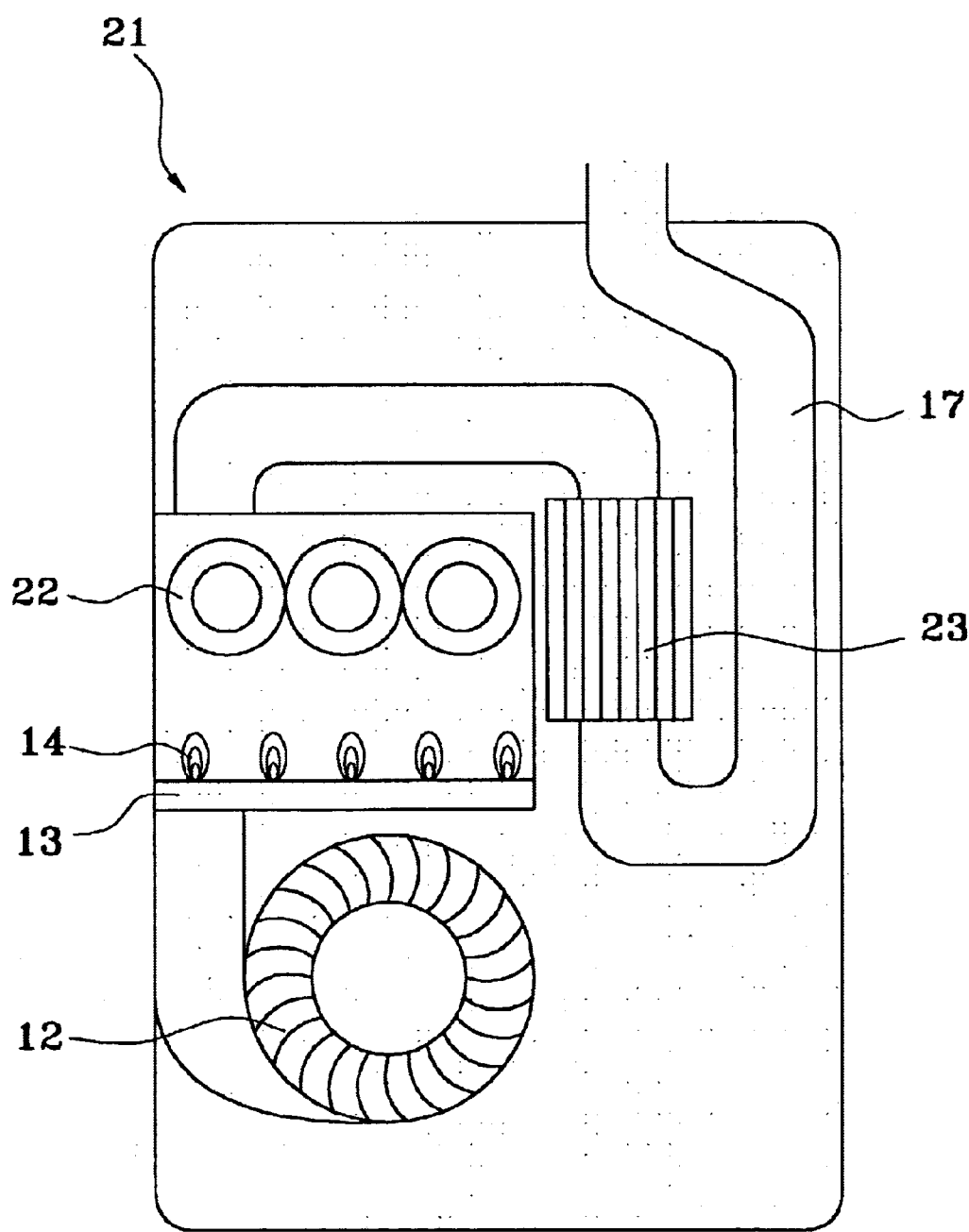
FIG. 2 is a configurational diagram schematically showing a conventional uptrend combustion type condensing boiler.
Figure 3:
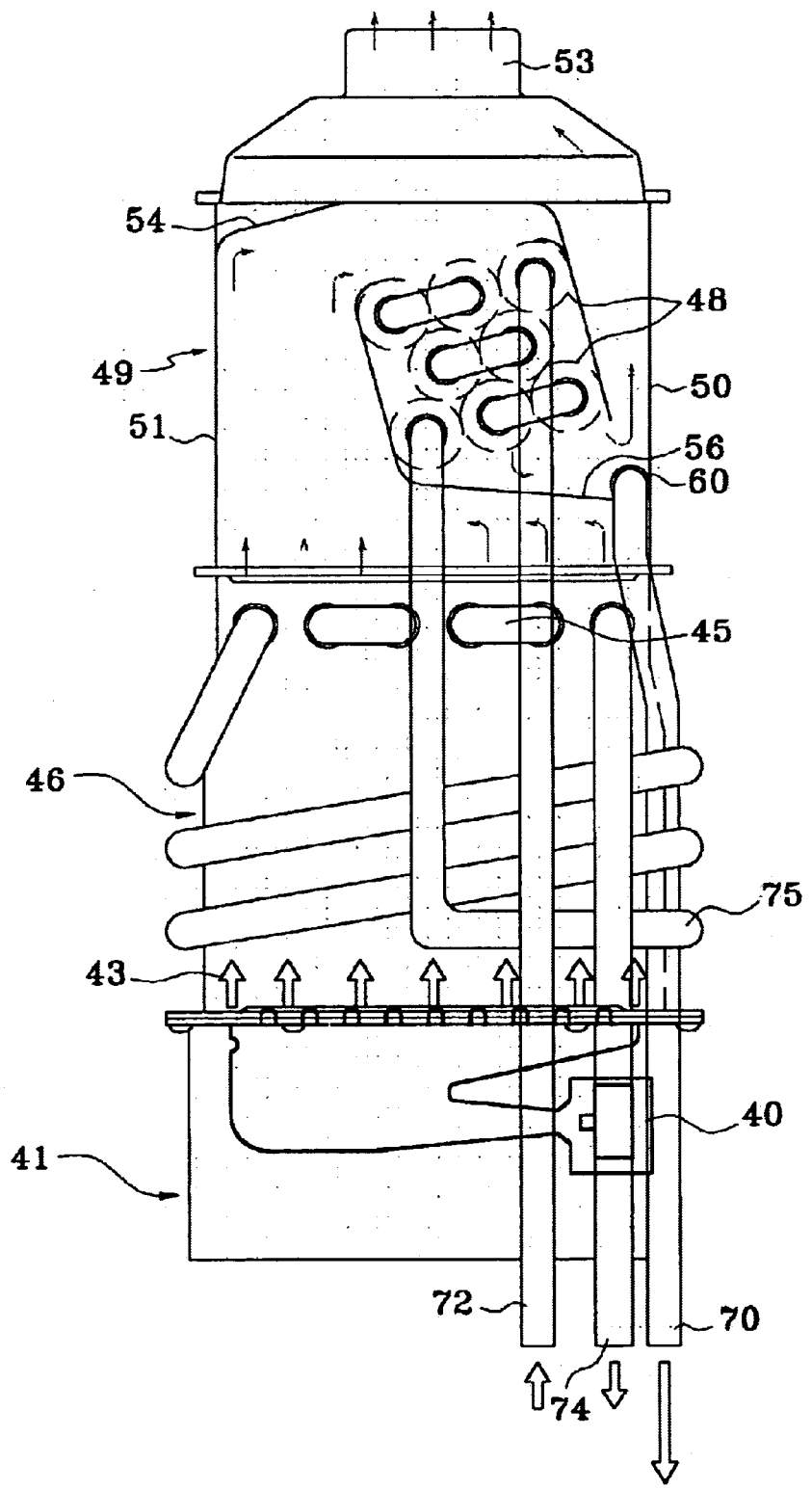
FIG. 3 is a configurational diagram schematically showing an uptrend combustion type condensing boiler according to the present invention.
Figure 4:
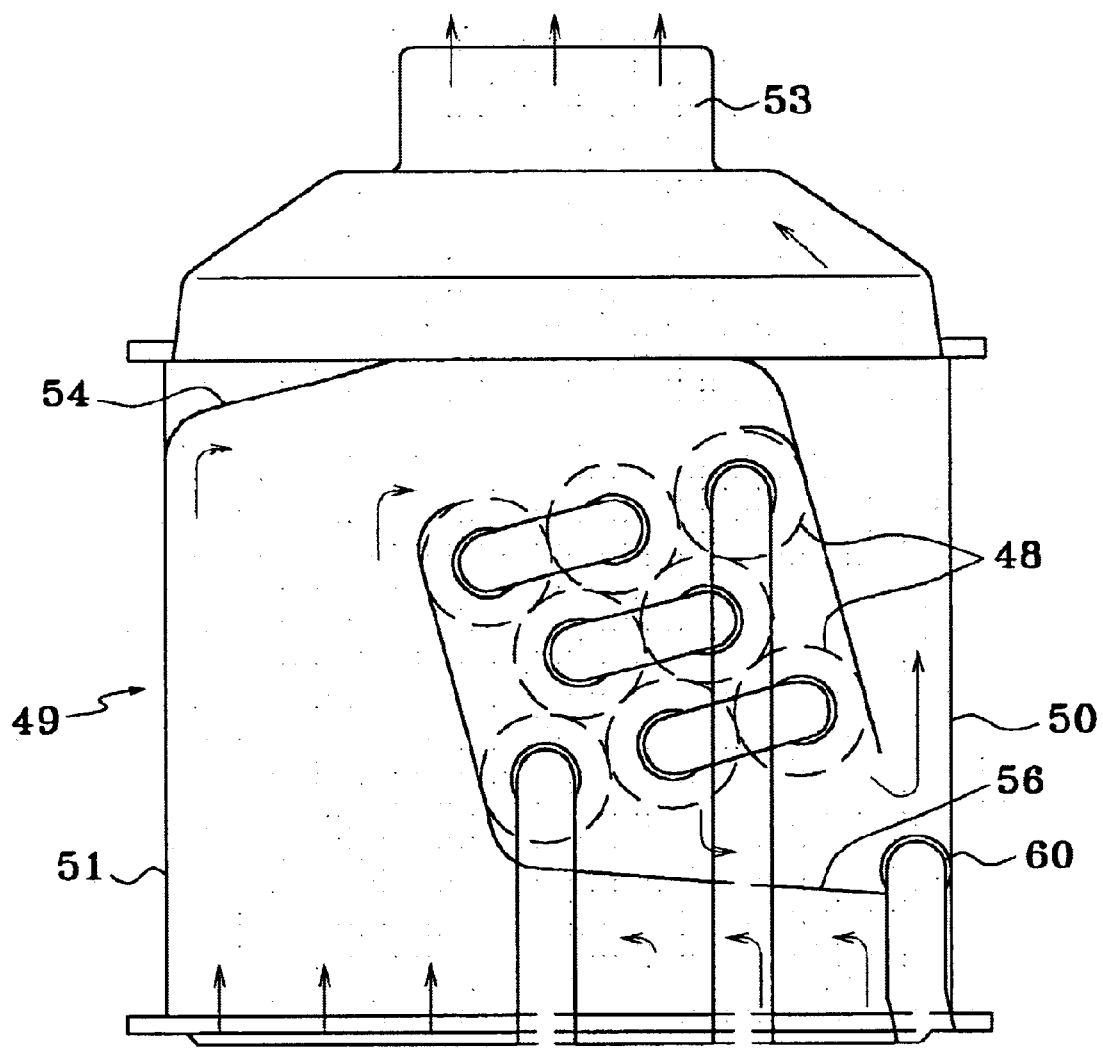
FIG. 4 a configurational diagram schematically showing a latent heat portion in the uptrend combustion type condensing boiler according to the present invention.

FIG. 3 is a configurational diagram schematically showing an uptrend combustion type condensing boiler according to the present invention, and FIG. 4 a configurational diagram schematically showing a latent heat portion in the uptrend combustion type condensing boiler according to the present invention.

As shown in FIG. 3, an uptrend combustion type condensed latent heat recollection condensing gas boiler according to the present invention, includes a burner unit 41 in which a burner 40 performs a combustion process for supplying heat, a present heat portion 46 provided with present heat exchangers 45 directly heat-exchanging heat generated from a combustion chamber 43 installed in the upper portion of the burner unit 41, and a latent heat portion 49 provided with latent heat exchangers 48 for absorbing heat of exhaust gas having passed through the present heat portion 46, in which the burner unit 41, the present heat portion 46, and the latent heat portion 49 are integrally stacked over one another, and installed in turn in a vertical direction.

An exhaust gas exit 53 is formed in the upper end of the latent heat portion 49, for discharging the exhaust gas outside.

Here, an exhaust gas guiding member is installed in the latent heat portion 49, to have a flowing path, so that the exhaust gas flowing in from the combustion chamber 43 flows into the rear-upper portion of the latent heat portion 49 to then flow into the front-lower portion of the latent heat portion 49.

Here, the exhaust gas guiding member includes an upper guiding plate 54 and a lower guiding plate 56. The lower guiding plate 56 is connected from the front-lower portion of the latent heat portion 49 to the rear-upper portion thereof, to thereby form a bent shape. The upper guiding plate 54 is connected from the rear-upper portion of the latent heat portion 49 to the front-lower portion thereof, to thereby form a bent shape.

That is, the upper guiding plate 54 and the lower guiding plate 56 are installed symmetrically with reach other. It is preferable that the upper and lower guiding plates 54 and 56 are formed of a smooth curved portion, respectively, in a manner that exhaust gas can be guided without undergoing a large resistance. The lower and upper guiding plates 54 and 56 can be modified or varied in various forms within the range of forming the above-described exhaust gas exit flowing path.

In the exhaust gas exit flowing path produced by the upper guiding plate 54 and the lower guiding plate 56, the latent heat exchangers 48 are installed in the flowing path for guiding the exhaust gas from the rear-upper portion to the front-lower portion.

That is, the latent heat exchangers 48 are installed in the upper guiding plate 54 and the lower guiding plate 56. The latent heat exchangers 48 can be installed in a double or multiple structures, respectively, and installed slantly in order to make a heat transfer area become larger.

Here, any one of tubes in the latent heat exchangers 48 is connected to a circulation water inflow tube 72 and another tube is connected to the present heat exchangers 45.

Also, condensed water is produced in the latent heat exchangers 48 in the process of heat exchanging with the exhaust gas. The condensed water falls down on the upper portion of the lower guiding plate 56.

Thus, a condensed water exit 60 for discharging the condensed water via the condensed water discharging tube 70 is formed at a side of the upper portion of the lower guiding plate 56.

Here, since the upper portion of the lower guiding plate 56 is slantly formed to one side, the dropped condensed water is collected to one side. Also, it is preferable that the condensed water exit 60 is formed on the bottom of the slanted portion of the lower guiding plate 56.

Also, the outer wall of the latent heat portion 49, and the upper and lower guiding plates 54 and 56 are portions where the exhaust gas directly contacts during flowing. In order to prevent a thermal loss by a heat insulation effect of an air layer, it is preferable that the latent heat portion 49 is formed of a double structure having an air layer therein.

Also, the present heat exchangers 45 of the present heat portion 46 is made of tubes of a copper or aluminium material, by a form rolling method, in order to heighten a heat exchanging rate.

Meanwhile, the inner portions of the latent heat exchangers 48 of the latent heat portion 49 are made of tubes of a copper material in order to avoid corrosion due to the condensed water, and the outer portions thereof are made of tubes of an aluminium material by using a form rolling method.

Hereinbelow, the function and effect of the present invention will be described in detail.

As described above, the uptrend combustion type condensed latent heat recollection condensing gas boiler according to the present invention includes a burner unit 41 in which a burner 40 performs a combustion process for supplying heat, a present heat portion 46 provided with present heat exchangers 45 directly heat-exchanging heat generated from a combustion chamber 43 installed in the upper portion of the burner unit 41, and a latent heat portion 49 provided with latent heat exchangers 48 for absorbing heat of exhaust gas having passed through the present heat portion 46, in which the burner unit 41, the present heat portion 46, and the latent heat portion 46 are integrally stacked over one another, and installed in turn in a vertical direction.

Also, the lower and upper guiding plates 56 and 54 which guide the exhaust gas collected to one side, for guiding the exhaust gas to flow to the front, are installed in the latent heat portion 49. Also, the latent heat exchangers 48 are provided on a flowing path where the exhaust gas is guided from the rear portion to the front portion. An exhaust gas exit 53 is formed in the upper end of the latent heat portion 49, for discharging the exhaust gas outside.

Also, the condensed water exit 60 for discharging the collected condensed water is formed in one side of the lower guiding plate 56.

In such a constructed structure, if the burner 40 in the burner unit 41 is activated, combustion occurs in the combustion chamber 43 to thereby generate heat. The heat is directly transferred to the present heat exchangers 45 provided in the upper portion of the combustion chamber 43.

The exhaust gas having passed through the present heat exchangers 45 flows into the latent heat portion 49 located in the upper portion of the present heat portion 46. The exhaust gas is guided and flows along the exhaust gas guiding member, that is, the upper guiding plate 54 and the lower guiding plate 56, in the latent heat portion 49.

That is, as shown in FIG. 4, the exhaust gas having flown into the latent heat portion 49 from the combustion chamber 43 is guided by the lower guiding plate 56 and collected into a space between the lower guiding plate 56 and a rear cover 51 of the latent heat portion 49 to then rise up.

Thereafter, the exhaust gas is guided by the upper guiding plate 54 and flows to the front portion of the latent heat portion 49. Then, the exhaust gas passes through the latent heat exchangers 48 installed between the upper guiding plate 54 and the lower guiding plate 56, to thus transfer heat. Then, the exhaust gas is guided upwards through a space between the upper guiding plate 54 and a front cover 50 of the latent heat portion 49, to then be discharged upwards via the exhaust gas exit 53.

Here, the exhaust gas exit 53 is integrally formed in the upper portion of the latent heat portion 49. Accordingly, there is no need to have a separate exhaust gas duct for guiding the exhaust gas.

Also, since the high-temperature exhaust gas is collected in a place of the rear portion of the latent heat portion 49 and then passes through the latent heat exchangers 48, the condensed latent heat can be absorbed under the optimal condition. Here, since the latent heat exchangers 48 are slantly installed, the heat transfer area becomes large to thereby enhance a heat exchanging efficiency furthermore.

Also, the low-temperature exhaust gas having passed through the latent heat exchangers 48 is guided into the front portion of the latent heat portion 49, and then discharged via the exhaust gas exit 53. Accordingly, the temperature of the front cover 50 of the latent heat portion 49 can be lowered.

Under the circumstances, the condensed water produced on the surface of the latent heat exchangers 48 falls down and moves to the bottom of the latent heat portion 49 via the slant lower guiding plate 56, to then be guided into the condensed water exit 60. Then, the condensed water is discharged via the condensed water discharging tube 70.

A circulation of the circulation water using the above-described heat transfer procedure will be described below. The circulation water becomes cool after having performed heating and then flows into the latent heat exchangers 48 via the circulation water inflow tube 72. The circulation water moves each tube in the latent heat exchangers 48 sequentially, to then absorb heat of the exhaust gas. In this manner, the circulation water is heat exchanged and pre-heated.

The circulation water having absorbed heat through the above-described procedure, flows into the present heat exchangers 45 located in the upper portion of the combustion chamber 43 via a connection tube 75, and absorbs combustion heat directly and then is discharged via the circulation water discharging tube 74. Accordingly, the circulation water plays a role of keeping a place to be warm and then returning via the circulation water inflow tube 72, repeatedly.

In the drawings, the latent heat exchangers 48 have been illustrated in three columns, but the present invention is not limited thereto. That is, the latent heat exchangers 48 can be formed of a variety of multiple structures.

Also, since the exhaust gas exit 53 is formed in the upper portion of the latent heat portion 49, and thus there is no need to have a separate exhaust gas duct for discharging the exhaust gas, the produce can be reduced in size.

Also, the inner portions of the latent heat exchangers 48 in the latent heat portion 49 are made of tubes of a copper material having a good heat transfer rate, and the outer portions thereof are made of tubes of an aluminium material. As a result, the copper tube contacting the condensed water is prevented from being corroded.

As described above, the condensing gas boiler for recollecting condensed latent heat by uptrend combustion, according to the present invention, enhances a heat exchanging efficiency and realizes a light, compact and corrosion-resistant product, by disposing latent heat exchangers in the same area as that of a combustion chamber, and perpendicular with the combustion chamber, installing an exhaust gas guiding member so that the exhaust gas is collected into a place in the rear portion of a latent heat portion to then pass through the latent heat exchangers, and installing the latent heat exchangers slantly in such a manner that re-absorption of the condensed latent heat can be done in the latent heat exchangers under the optimal condition.

The present invention is not limited in the above-described embodiment. It is apparent to one who is skilled in the art that there are many variations and modifications without departing off the spirit of the present invention and the scope of the appended claims.

What is claimed is:

1. An uptrend combustion type condensing gas boiler for recollecting condensed latent heat, comprising:
    a burner installed in the lower portion of a combustion chamber, for supplying heat;
    a present heat portion provided with present heat exchangers absorbing heat generated from the burner; and
    a latent heat portion provided with latent heat exchangers for absorbing heat of exhaust gas having passed through the present heat portion,
    wherein the uptrend combustion type condensing gas boiler comprising:
       the latent heat portion integrally deposited on the upper portion of the present heat portion which is integrally formed with the combustion chamber, perpendicular with the present heat portion;
       an exhaust gas guiding member which is installed so that the exhaust gas is collected into a place in the rear portion of the latent heat portion to then flow into the front portion of the latent heat portion;
       the latent heat exchangers provided along the path where the exhaust gas flows from the rear portion to the front portion; and
       an exhaust gas exit formed in the upper end of the latent heat portion, for discharging the exhaust gas outside.

2. The uptrend combustion type condensing gas boiler of claim 1, wherein the exhaust gas guiding member comprises: a lower guiding plate for collecting the exhaust gas flowing in from the combustion chamber into a place of the rear portion of the latent heat portion; and an upper guiding plate for making the exhaust gas collected in the place of the rear portion of the latent heat portion flow to the front portion so as to be discharged upwards.

3. The uptrend combustion type condensing gas boiler of claim 1, wherein the exhaust gas exit is integrally formed in the latent heat portion.

4. The uptrend combustion type condensing gas boiler of claim 1, wherein any one of the tubes in the latent heat exchangers is connected to the circulation water inflow tube and another tube is connected to the present heat exchangers.

5. The uptrend combustion type condensing gas boiler of claim 1, wherein the latent heat exchangers are installed slantly in order to maximize a heat transfer area.

6. The uptrend combustion type condensing gas boiler of claim 2, wherein a condensed water exit for discharging condensed water via the condensed water discharging tube is formed in one side of the upper portion of the lower guiding plate.

7. The uptrend combustion type condensing gas boiler of claim 1, wherein the latent heat exchangers are formed of a multiple structure or a multiple array.

8. The uptrend combustion type condensing gas boiler of claim 1, wherein the inner portions of the latent heat exchangers are made of tubes of a copper material for corrosion-prevention, and the outer portions thereof are made of tubes of an aluminium material by a form rolling method.

9. The uptrend combustion type condensing gas boiler of claim 1, wherein the present heat exchangers are made of tubes of a copper material by a form rolling method.

10. The uptrend combustion type condensing gas boiler of claim 1, wherein the present heat exchangers are made of tubes of an aluminium material by a form rolling method.

11. The uptrend combustion type condensing gas boiler of claim 1, wherein the latent heat exchangers and the exhaust gas guiding member are formed of a double structure having an air layer therein in order to prevent a thermal loss.

* * * * *